(12) United States Patent
Tourigny

(10) Patent No.: US 10,655,742 B2
(45) Date of Patent: May 19, 2020

(54) FLUID INJECTION DEVICE AND METHOD OF USING THE SAME

(71) Applicant: Zynon Technologies, LLC, New Britain, CT (US)

(72) Inventor: Jay S. Tourigny, Collinsville, CT (US)

(73) Assignee: ZYNON TECHNOLOGIES, LLC, New Britain, CT (US)

( * ) Notice: Subject to any disclaimer, the term of this patent is extended or adjusted under 35 U.S.C. 154(b) by 46 days.

(21) Appl. No.: 16/141,199

(22) Filed: Sep. 25, 2018

(65) Prior Publication Data

US 2019/0093778 A1     Mar. 28, 2019

Related U.S. Application Data

(60) Provisional application No. 62/563,372, filed on Sep. 26, 2017.

(51) Int. Cl.
| | | |
|---|---|---|
| *F16K 17/16* | (2006.01) | |
| *F16L 55/164* | (2006.01) | |
| *F25B 45/00* | (2006.01) | |

(52) U.S. Cl.
CPC ........ *F16K 17/1626* (2013.01); *F16L 55/164* (2013.01); *F25B 45/00* (2013.01); *F25B 2345/006* (2013.01); *F25B 2500/22* (2013.01)

(58) Field of Classification Search
CPC F25B 45/00; F25B 2345/006; F25B 2500/22; F16K 17/1626; F16L 55/164
See application file for complete search history.

(56) References Cited

U.S. PATENT DOCUMENTS

| | | | | |
|---|---|---|---|---|
| 3,391,951 | A | * | 7/1968 | Miller ................... F16L 29/005 285/3 |
| 3,424,181 | A | * | 1/1969 | Morse ..................... F16K 1/306 137/68.3 |
| 6,662,587 | B2 | | 12/2003 | Rembold et al. |
| 7,077,149 | B2 | | 7/2006 | Kalley et al. |
| 9,709,307 | B2 | | 7/2017 | Carrubba et al. |
| 2011/0041522 | A1 | | 2/2011 | Carrubba |
| 2013/0118187 | A1 | | 5/2013 | Carrubba |
| 2016/0178107 | A1 | | 6/2016 | Cacciabeve et al. |
| 2016/0290695 | A1 | | 10/2016 | Bi et al. |

\* cited by examiner

*Primary Examiner* — P. Macade Nichols
(74) *Attorney, Agent, or Firm* — Cantor Colburn LLP

(57) ABSTRACT

A fluid injection device (10) for injecting a dispensible fluid such as a liquid sealant (24) into an air conditioning or refrigeration system or the like, includes a tube (12, 12', 12") containing the fluid sealant in a storage chamber (26, 26', 26"). Outlet valves conventionally used at the tube outlet are replaced with a rupturable membrane (28, 28', 66). Means to rupture the membrane may comprise a puncture tool (32, 50), or the membrane may be designed to burst under pressure imposed on it in use. Use of membrane (28, 28', 66) at the outlet of device 10 avoids problems caused by even very slight leakage of fluid sealant past an outlet valve. The fluid injection device (10) is used by connecting the tube inlet to a high pressure zone of the system and connecting the tube outlet to a low pressure zone of the system.

20 Claims, 6 Drawing Sheets

FLUID INJECTION DEVICE AND METHOD OF USING THE SAME

CROSS-REFERENCE TO RELATED APPLICATION

This application claims priority of provisional patent application Ser. No. 62/563,372 filed on Sep. 26, 2017 in the name of Jay S. Tourigny and entitled "Fluid Injection Device and Method of Using the Same".

BACKGROUND OF THE INVENTION

Field of the Invention

The present invention concerns a fluid injection device for injecting a fluid, such as a sealant liquid, into a system, such as an air conditioning or refrigeration system, and a method of injecting such fluid, e.g., liquid, into such system using the injection device.

Description of Related Art

Devices for the injection of a dispensible fluid, such as a liquid sealant, into air conditioning and refrigeration systems are known in the art. For example, Cacciabeve et al. Published Patent Application US 2016/0178107 A1, entitled "Sealant Hose and Method of Use", was published on Jun. 23, 2016. A sealant hose is shown in FIG. 2 in an exploded view and, as illustrated in FIG. 1, has its inlet end 14 connected by a refrigerant service hose to an air conditioning manifold gauge and its outlet end 16 connected to the service port of an air conditioning system. FIG. 4 shows the outlet valve 16 which is connected to the outlet end of the tube 12 (FIG. 2) and FIG. 3 shows the inlet valve 14 which is connected to the inlet end of the tube 12 (FIG. 2). Fluid sealant is contained within the tube 12. The outlet valve 16 (FIG. 4) comprises a first housing 54 and a second housing 56 and is configured to be opened when attached to the air conditioning service port by a tapered member (not shown in the drawings) of the service port. The inlet end is connected by means of a refrigerant service hose to the air conditioning manifold outlet (FIG. 1). Connection of the outlet valve 16 to the service port opens the valve so that the pressure from the air conditioning manifold dispenses the fluid sealant through outlet valve 16.

A significant problem encountered by prior art fluid injection devices such as that of the aforesaid Cacciabeve et al. publication is leakage of the sealant past the fluid outlet valve prior to use, for example, during manufacture, storage and/or shipment. Such leakage may occur because of failure of the outlet valve components to fully seat against each other, or by vibration during shipment, etc. Experience has shown that contact of some liquid sealants with moisture, e.g., atmospheric humidity, is highly problematic. Even very slight leakage of such sealant past the outlet valve will cause the sealant to eventually polymerize and effectively glue the outlet valve components together, rendering the injection device useless. An unacceptably high degree of failure of injection devices utilizing such prior art valves at the outlet end of the device has been reported. Considerable expense is incurred by the too-frequent return and reworking of injection devices which are rendered inoperative because of leaked sealant, to say nothing of significant customer dissatisfaction.

U.S. Pat. No. 6,662,587, entitled "AC and HP Service Valves For Manufactured Housing", issued Dec. 16, 2003 to Thomas K. Rembold et al. discloses apparatus for connecting a first pre-charged section of an air conditioning system to refrigerant lines connecting the section to a second section of the system. A connector having a penetratable seal is mounted in the end of a channel opposite to the end of the channel which is connected to a component of the air conditioning system. The connector has a male fitting that is threaded into a female fitting. The seal is ruptured or broken when the male fitting is threaded into the female fitting a sufficient depth to establish a leak proof joint therebetween. See the Abstract, FIG. 2 and column 2, line 63 to column 3, line 10.

Patent Application Publication US 2016/0290695 A1, entitled "Device For Adding Refrigerant Into Automobile Air Conditioning System", of Da Ming BI discloses a device for adding refrigerant into an automobile air conditioning system. FIGS. 5 and 7 show a piercing member 13 which, as described in paragraph [0045] pierces a seal on a refrigerant canister to admit refrigerant stored in the canister into the system.

SUMMARY OF THE INVENTION

Generally, the present invention provides a fluid injection device for injecting a dispensible fluid into a pressurized closed system such as an air conditioning or refrigeration system containing a pressurized fluid. The device comprises a tube containing a dispensible fluid and having an inlet closure member, such as a Schrader valve, to close the inlet end of the device. The fluid injection devices of the present invention overcome the above-described sealant liquid leakage problem by replacing the valves conventionally used to close the outlet end of the device with an impermeable but rupturable membrane. The method of the present invention generally provides for connecting the inlet end to a high pressure zone of a closed system and connecting the outlet end to a low pressure zone of the closed system whereby the resulting pressure differential discharges the dispensible fluid into the system through the ruptured membrane.

Specifically, in accordance with the present invention there is provided a fluid injection device for injecting a dispensible fluid into a pressurized system having therein relatively high and low pressure zones of a pressurized fluid, the fluid injection device comprising the following components. A tube has an inlet end and an outlet end, the inlet end having thereon an inlet closure member which is connectable in fluid flow communication to such high pressure zone, and the outlet end having thereon an outlet fixture which is connectable in fluid flow communication with such low pressure zone, to thereby enable connection of the injection device to such pressurized system. The outlet fixture may comprise an impermeable but rupturable membrane spaced from the inlet closure member to define within the tube a closed storage chamber disposed between the inlet closure member and the membrane, the membrane being configured to close the outlet fixture to fluid flow therethrough. A dispensible fluid is disposed within the closed storage chamber and the inlet closure member is operable from a closed position which seals the inlet end to an open position which opens the inlet end to passage therethrough of such pressurized fluid from such high pressure zone into the device. Upon connection of the fluid injection device to such pressurized system, the membrane is ruptured and the dispensible fluid is dispensed through the outlet fixture into such low pressure zone.

In another aspect of the present invention, the fluid injection device further comprises a puncture tool mounted on the device adjacent to the membrane and configured to be movable from a retracted, membrane-intact position to an extended position in which the tool punctures the membrane. A related aspect of the invention provides for the puncture tool to be configured to automatically be moved from the retracted position to the extended position to puncture the membrane upon connection of the inlet closure member to such low pressure zone.

Yet another aspect of the present invention provides for the inlet closure member to be configured to automatically be opened upon connection of the inlet closure member to such high pressure zone.

Other aspects of the present invention provide one or more of the following additional features, alone or in any suitable combination. The fluid injection device may comprise an outlet passage adjacent the outlet end of the tube and the membrane closes the outlet passage to flow of the dispensible fluid therethrough; the outlet passage may be defined at least in part by the outlet fixture; the outlet fixture may comprise a fixture body having a connector extension which connects the outlet fixture to the outlet end of the tube, the outlet passage may extend through the connector extension, and the membrane may be disposed within the outlet passage; the dispensible fluid may be a sealant fluid suitable for sealing leaks in a closed system; and the tube may comprise a moisture-impermeable material.

In accordance with another aspect of the present invention, there is provided a fluid injection device for injecting a dispensible fluid into a pressurized system containing therein relatively high and low pressure zones of a pressurized fluid, the fluid injection device comprising: a tube having an inlet end and an outlet end, the inlet end having thereon an inlet closure member which may comprise a Schrader valve and which is connectable in fluid flow communication to such high pressure zone, and the outlet end having thereon an outlet fixture which is connectable in fluid flow communication with such low pressure zone, to thereby enable connection of the injection device to such pressurized system. The outlet fixture may comprise an impermeable, rupturable membrane spaced from the inlet closure member to define within the tube a closed storage chamber disposed between the inlet closure member and the membrane, the membrane being configured to close the outlet fixture to fluid flow therethrough. A dispensible fluid, which may comprise a sealant fluid for sealing leaks in the pressurized system, is disposed within the closed storage chamber, and a puncture tool is mounted within the outlet fixture for automatic movement of the puncture tool upon the outlet fixture being connected to such low pressure zone, the automatic movement of the tool being from a retracted, membrane-intact position to an extended membrane-puncturing position of the tool. The inlet closure member may be configured to automatically, upon being connected to such high pressure zone, move from a closed position to an open position to permit passage therethrough of such pressurized fluid from such high pressure zone into the device to dispense the dispensible fluid through the outlet fixture into such low pressure zone.

Another aspect of the present invention provides that the outlet fixture may comprise a fixture body having a connector extension through which the outlet passage extends, and the membrane is disposed within the outlet passage.

In accordance with a method aspect of the present invention, there is provided a method of injecting a dispensible fluid into a pressurized system containing a pressurized fluid, the pressurized system defining a relatively high pressure zone and a relatively low pressure zone of pressurized fluid, the method comprising the following steps: connecting to the pressurized system a fluid injection device comprising a tube having an inlet end having thereon an inlet closure member and an outlet end having thereon an outlet fixture, the outlet fixture comprising an impermeable rupturable membrane, which closes the outlet fixture to fluid flow therethrough and cooperates with the inlet closure member to define a closed storage chamber containing therein a dispensible fluid, and disposed within the tube between the inlet closure member and the rupturable membrane. The step of connecting the device to the closed system comprises connecting the inlet closure member in fluid flow communication to the high pressure zone and connecting the outlet fixture to the low pressure zone, and opening the inlet closure member to permit passage therethrough of the pressurized fluid from the high pressure zone, to rupture the rupturable membrane and dispense the dispensible fluid through the outlet fixture into the low pressure zone.

Another aspect of the method of the present invention comprises rupturing the rupturable membrane by piercing the membrane with a puncture tool. Still another method aspect of the present invention comprises rupturing the rupturable membrane by pressurizing the dispensible fluid sufficiently to rupture the membrane.

In accordance with other method aspects of the present invention, the following additional features are provided, alone or in any suitable combination: the inlet closure member is opened automatically upon connection of the inlet closure member to the high pressure zone; and the outlet fixture is configured to automatically move the puncture tool, when present, to rupture the membrane upon connection of the outlet fixture to the low pressure zone.

Other aspects of the present invention will be apparent from the following description and drawings.

As used herein and in the claims, the following terms have the indicated meanings. The term "dispensible fluid" means dispensible liquids, pastes, gels and the like, including without limitation, liquid polymers, liquids with fine particulate solids suspended therein, and mixtures thereof. The term "impermeable" means that a component is impermeable to fluid substances, such as, for example, moisture or the dispensible fluid. For example, as applied to the rupturable membrane, the defined term means that the membrane is impermeable until it is ruptured. The term "yieldable" applied to a member has its usual meaning of the member being capable of being physically compressed, deformed or moved by a force imposed upon it.

DETAILED DESCRIPTION OF THE INVENTION AND SPECIFIC EMBODIMENTS THEREOF

Figure 1:
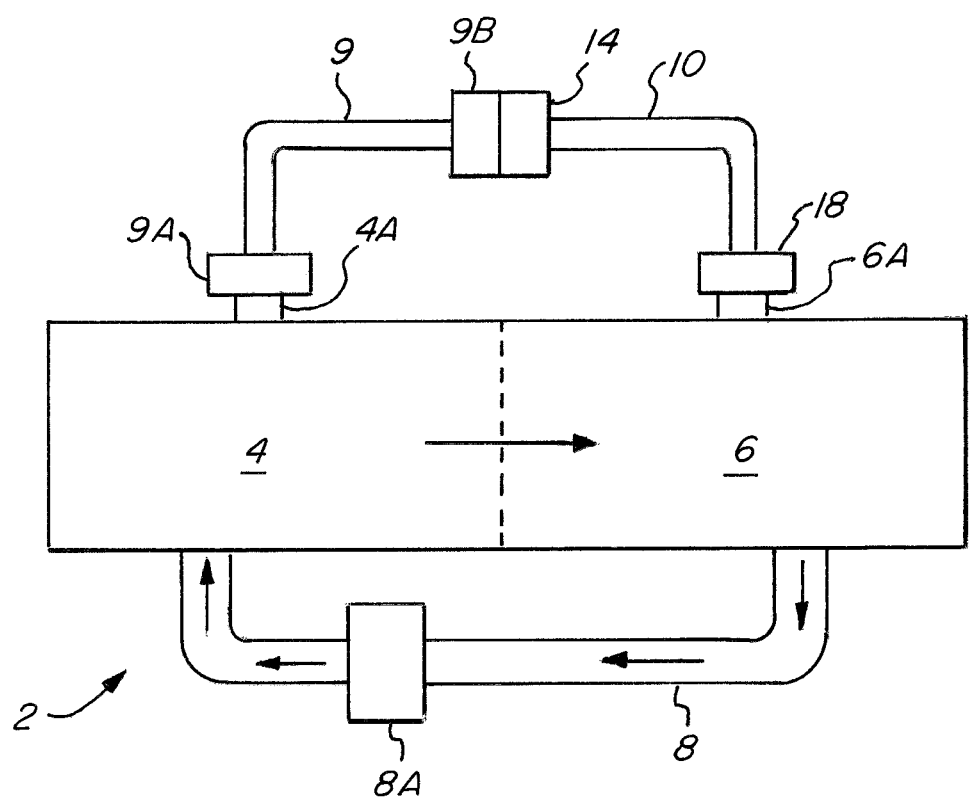
FIG. 1 is a schematic diagram showing the connection of a device in accordance with the present invention to a pressurized system.

Referring now to FIG. 1, a pressurized closed system 2, such as an air conditioning or refrigeration system, is schematically shown as comprising a high pressure zone 4 in which the pressurized fluid (not shown) is at a higher pressure than it is in the low pressure zone 6. Pressure zones 4 and 6 are connected by a return loop 8 within which is disposed a compressor 8A, which compresses return pressurized fluid from low pressure zone 6 and introduces the re-pressurized fluid into high pressure zone 4. The flow path of pressurized fluid within system 2 is indicated by the un-numbered arrows.

An extension hose 9 is connected by connectors 9A and 9B to, respectively, a connector port 4A, for example at the manifold of pressurized system 2, and to inlet closure member 14. This connects injection device 10 in accordance with an embodiment of the present invention to inlet closure member 14 of fluid injection device 10. Fluid injection device 10 has an outlet fixture 18 at its outlet end which is connected in fluid flow communication to a service port 6A at the low pressure zone 6 of system 2. The function of extension hose 9 is simply to effectuate connection of device 10 in cases where fluid injection device 10 is not long enough to make the connection between connector port 4A and service port 6A. If connector port 4A and service port 6A are close enough to be connected by fluid injection device 10, extension hose 9 is not needed. As described in more detail below, a dispensible fluid (not shown in FIG. 1) is contained within fluid injection device 10 and is injected into the system 2 by the pressure difference between pressure zones 4 and 6.

Figure 2:
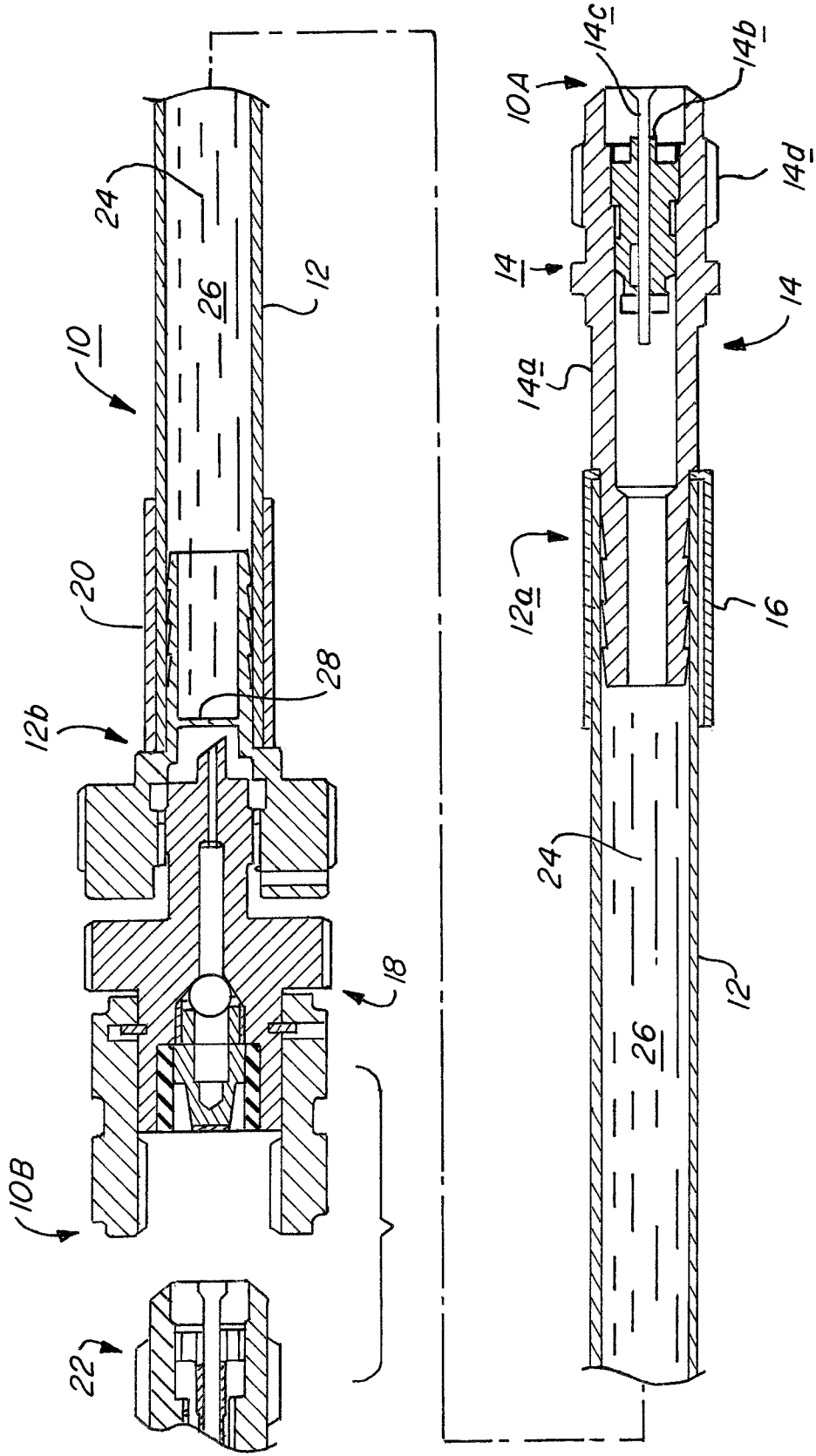
FIG. 2 is a cross-sectional view of one embodiment of the injection device of the present invention.

Referring to FIG. 2, there is shown in more detail the fluid injection device 10 of FIG. 1. Fluid injection device 10 has an inlet end 10A and an opposite outlet end 10B. Device 10 is comprised of a tube 12 having a tube inlet end 12a and an opposite tube outlet end 12b. Inlet end 12a has an inlet closure member 14 secured thereto by a first ferrule 16. Outlet end 12b has an outlet fixture 18 secured thereto by a second ferrule 20. Tube 12 defines a closed storage chamber 26 disposed between inlet closure member 14 and an impermeable rupturable membrane 28 disposed within outlet fixture 18 as more fully described below. A fluid sealant 24 is disposed within storage chamber 26.

Tube 12 is preferably comprised of a moisture-impermeable material and is transparent or translucent, or at least has a transparent or translucent section, to enable a user to see the dispensible fluid contained within a storage chamber 26 (FIG. 2) defined within tube 12, and to see the transport of such dispensible fluid through tube 12 for discharge from the outlet fixture 18. Tube 12 may, for example, be a polyvinyldifluoride such as that sold under the trademark Kynar by Arkema, Inc., or any other suitable material.

The moisture impermeability of tube 12 enables the tube to be used with dispensible fluids which are highly reactive with water. For example, one suitable and commercially available liquid sealant comprises a ternary silane which is highly reactive with moisture and which, when in contact with moisture, will polymerize to form a solid. It is therefore important to maintain such dispensible sealant liquids isolated from contact with moisture until the sealant liquid is dispensed into an air conditioning or refrigeration pressurized closed system. As the sealant liquid is dispersed throughout the closed system, pin-point openings which cause leaks are contacted by the sealant, which reacts with moisture, such as atmospheric humidity or water condensate present at the exteriors of the pin-point openings. The sealant then polymerizes to seal the site or sites of the leak.

Figure 2A:
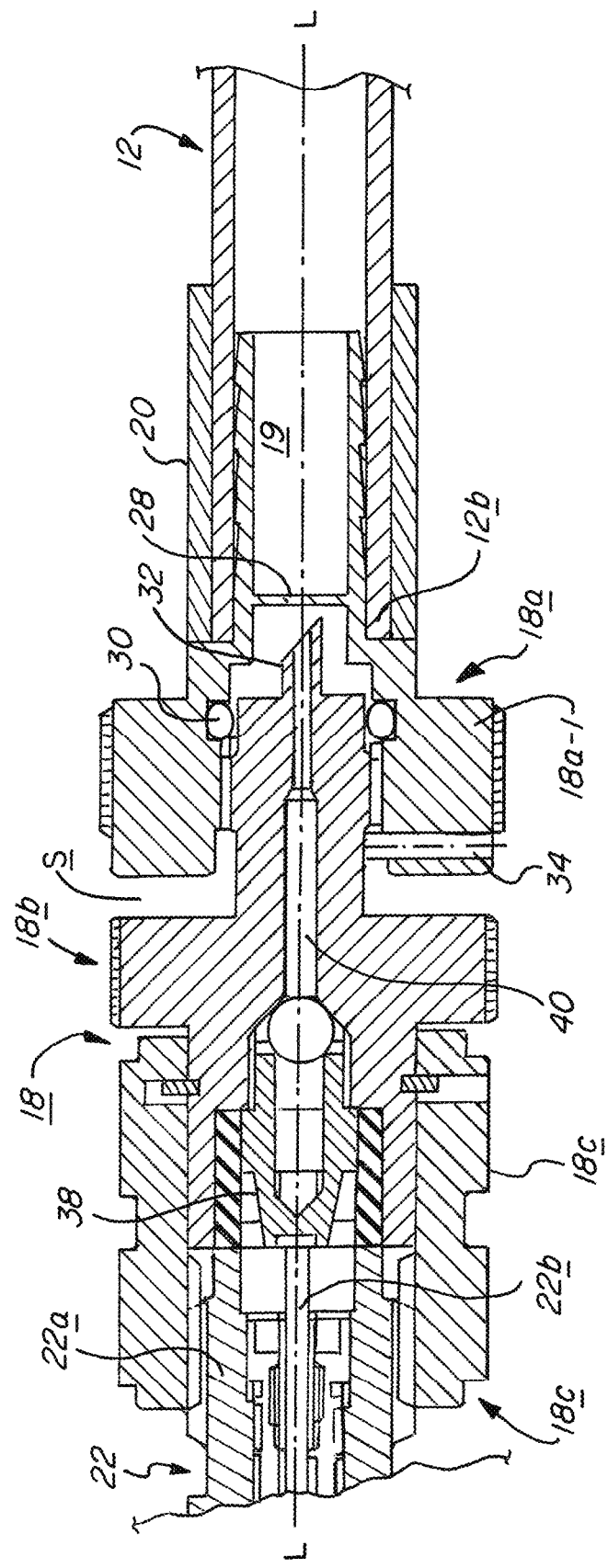
FIG. 2A is a view enlarged relative to FIG. 1 showing the outlet fixture of the device of FIG. 2 in its retracted position.

Referring to FIG. 2A, outlet fixture 18 comprises a connector housing 18a and a tool housing 18b, surmounted by a connector member comprising, in the illustrated embodiment, a threaded collar 18c which serves to connect outlet fixture 18 to a service port 22 (FIGS. 2 and 2A) of a low pressure zone of a pressurized system such as that schematically illustrated in FIG. 1. Service port 22, as best seen in FIG. 2A, typically comprises a Schrader valve 22a having the conventional operating pin 22b. In use, threaded collar 18c secures outlet fixture 18 to service port 22 and, as described in more detail below, operating pin 22b serves to drive tool housing 18b longitudinally towards connector housing 18a to puncture membrane 28 with puncture tool 32 when device 10 is placed in use. Tightening threaded collar 18c onto service port 22 also depresses operating pin 22b to thereby open Schrader valve 22a.

Figure 2B:
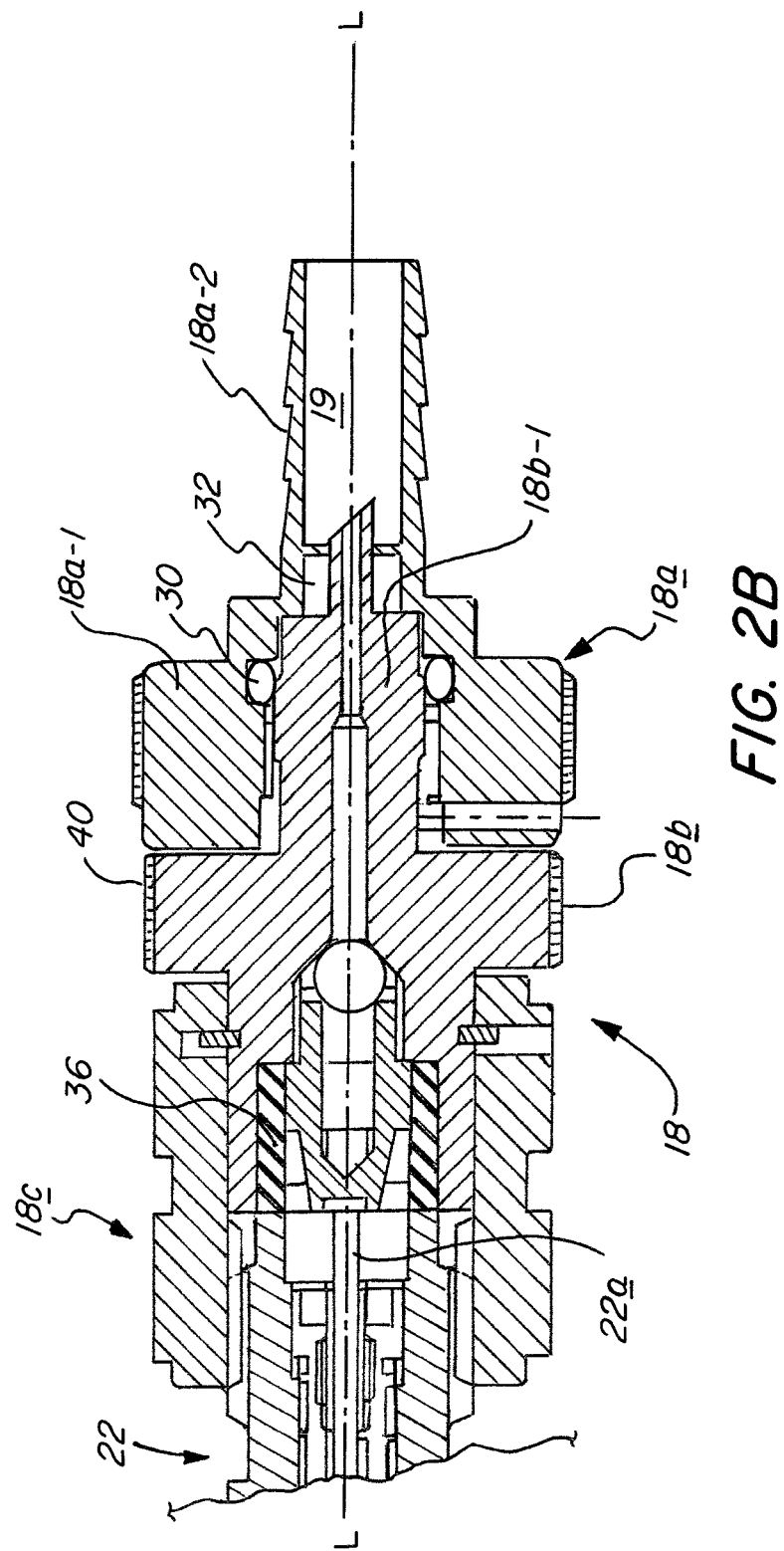
FIG. 2B is a view of the outlet fixture portion of FIG. 2A, but in its extended position.

Referring to FIGS. 2A and 2B, connector housing 18a comprises a substantially doughnut-shaped receiver body 18a-1 and a connector extension 18a-2 which is hollow to define a portion 19 of the outlet passage (more fully described below) of device 10. The exterior of connector extension 18a-2 is ridged in a saw-tooth configuration to, in conjunction with second ferrule 20, enable secure mounting of the outlet end 12b of tube 12 onto connector extension 18a-2. First ferrule 16, inlet end 12a and the body of inlet closure member 14 (FIG. 2) are arranged similarly or identically to the above-described arrangement of the corresponding parts at outlet end 12b.

Axis L-L in FIGS. 2A and 2B shows the axial centerline of injection device 10. Membrane 28 is, in the illustrated embodiment, integrally formed with connector housing 18a, more specifically, within the portion 19 of the outlet passage in the connector extension 18a-2. Membrane 28 may be formed by drilling the portion 19 of the outlet passage formed within receiver body 18a-1 and connector extension 18a-2 from opposite sides along longitudinal axis L-L, the drilling stopping short of removing all the material in order to leave behind a thin, integrally formed rupturable membrane 28 closing the portion 19 of the outlet passage. As the outlet fixture 18, including the connector housing 18a, is usually made of metal, e.g., steel, membrane 28 is, in this embodiment, made of metal. In other embodiments described below, the membrane may be part of the tube and therefore may be made of a polymeric material. An O-ring 30 provides a seal between connector housing 18a and the nose portion 18b-1 of tool housing 18b. A hollow puncture tool 32 is mounted within nose portion 18b-1. The portion 19 of the outlet passage extends through outlet fixture 18 and into service port 22 along longitudinal axis L-L thence into a closed system such as an air conditioning or refrigeration unit (not shown in FIG. 2A).

A tubular gasket 36 helps seal the portion 19 of the outlet passageway and surmounts a check valve 38 which serves to prevent backflow from service port 22 into injection device 10. The portion 19 of the outlet passage extends through connector extension 18a-2, the bore (un-numbered) passing through hollow puncture tool 32, outlet passage extension 40 in tool housing 18b, check valve 38, thence into Schrader valve 22a for entry into the closed system served by service port 22. Generally the outlet passage follows the illustrated portion of longitudinal axis L-L.

An O-ring 30 provides a seal between nose portion 18b-1 of tool housing 18b and connector housing 18a. As seen in FIG. 2A, which shows outlet fixture 18 in its retracted position, connector housing 18a is spaced from tool housing 18b by a space S. A spring pin 34 is formed on the portion of receiver body 18a-1 in space S facing tool housing 18b. During shipment and storage of fluid injection device 10 a puncture tool restraint member, such as a spacer ring (not shown) is inserted into space S and held in place by spring pin 34. The spacer ring immobilizes tool housing 18b to prevent premature puncturing of membrane 28 by puncture tool 32. Just prior to use, the spacer ring is removed in order to free tool housing 18b to move from the retracted position shown in FIG. 2A to the extended position shown in FIG. 2B, in which it contacts connector housing 18a and punctures membrane 28 with puncture tool 32.

Inlet closure member 14 (FIG. 2) comprises a sleeve 14a within which is disposed a suitable closure means such as a Schrader valve 14b having the usual bore (un-numbered) extending therethrough, and the usual operating pin 14c. A threaded inlet collar 14d surmounts sleeve 14a and is configured to connect the inlet closure member 14 to a suitable port of a pressurized system. Such connection of inlet closure member 14 depresses operating pin 14c and thereby opens Schrader valve 14b to admit pressurized fluid from the pressurized system into device 10.

In use, inlet closure member 14 is secured to a connector port in a high pressure zone of a system, such as connector port 4A (FIG. 1), by means of threaded inlet collar 14d of inlet closure member 14. Outlet fixture 18 is secured to a port in a low pressure zone of a system, such as service port 6A (FIG. 1) by means of threaded collar 18c of outlet fixture 18. Connection of the outlet fixture 18 to the service port advances the connector housing 18a into the tool housing 18b to force puncture tool 32 through membrane 28 to rupture the membrane. A conventional valve which may, for example, be located on the system manifold (not shown) is then opened so that the refrigerant in the high pressure zone enters storage chamber 26 through opened Schrader valve 14b. Fluid sealant 24 is forced out of storage chamber 26 by the pressure imposed on it from the high pressure zone of the system, e.g., an air conditioning or refrigeration system. The fluid sealant 24 is thereby injected into the low pressure zone of the system. When the liquid sealant has been discharged from device 10, the valve may be closed and the device 10 disconnected from the system 2. Removal of the outlet fixture 18 from the service port 22 causes the service port Schrader valve to automatically close.

Figure 3:
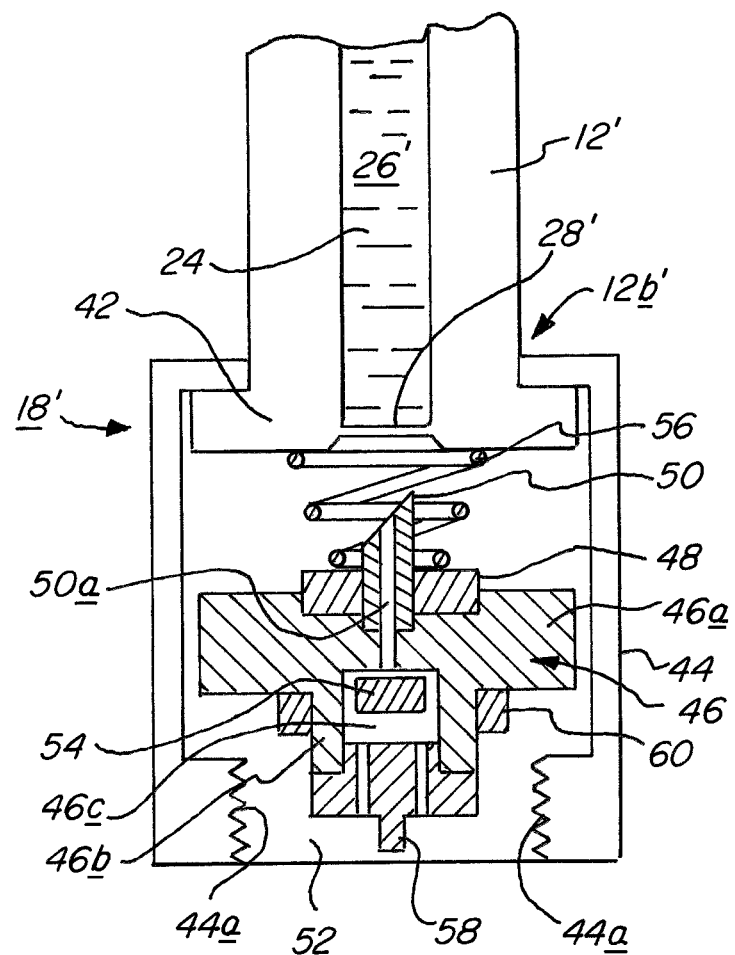
FIG. 3 is a schematic cross-sectional view in elevation with part broken away of the outlet fixture of a second embodiment of the present invention with the outlet fixture in the retracted position.
Figure 4:
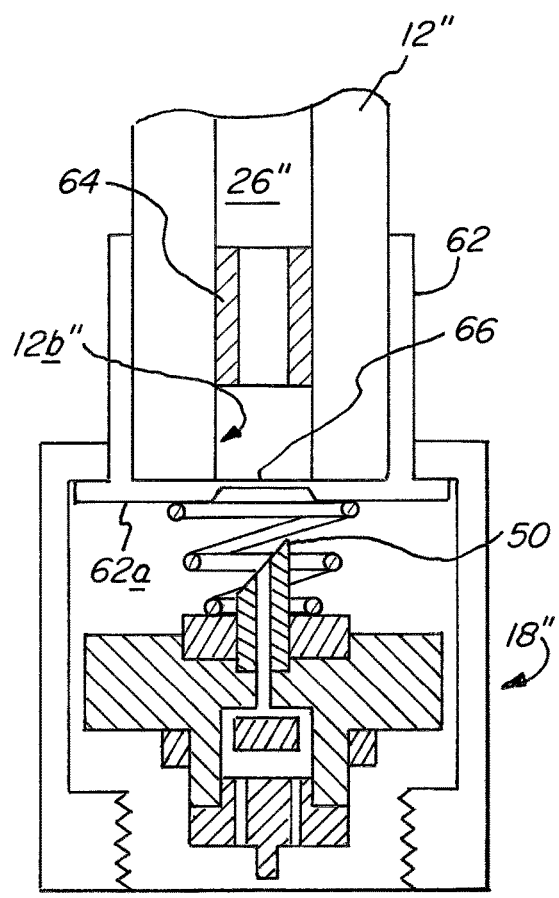
FIG. 4 is a schematic view corresponding to that of FIG. 3 but of a third embodiment of the present invention.
Figure 5:
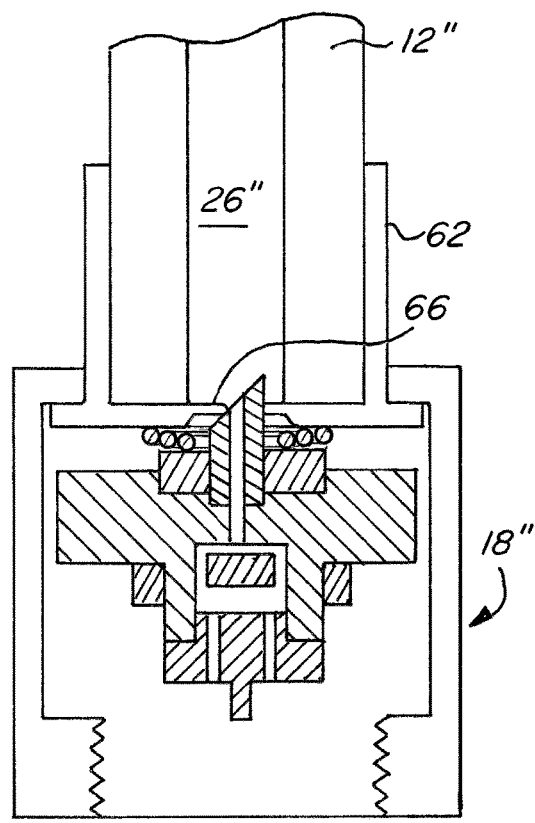
FIG. 5 is a view of the outlet fixture of FIG. 4 with the outlet fixture in the extended position.

FIGS. 3-5 illustrate outlet fixtures in accordance with other embodiments of the present invention in which the outlet fixture, its connection to the outlet end of the tube, and the rupturable membrane are configured differently from those of the embodiment of FIGS. 2 to 2B. The remaining portions of the devices of FIGS. 3-5 are identical or similar to the embodiment of FIGS. 2 to 2B and therefore these portions are not re-described or numbered.

Referring now to FIG. 3, tube 12' has at its outlet end 12b' an enlarged diameter end collar 42 in which is formed a rupturable membrane 28' which, in the illustrated embodiment, is thinner than the walls (unnumbered) and end collar 42 of tube 12'. Outlet fixture 18' is mounted on end collar 42 and comprises a threaded outlet collar 44 which serves to mount outlet fixture 18' on end collar 42, and a discharge assembly 46 received within outlet collar 44. Discharge assembly 46 has a head portion 46a which is of larger diameter than tubular shaft portion 46b. Head portion 46a has a circular recess (unnumbered) formed therein to receive a gasket 48 which projects above the top surface (as viewed in FIG. 3) of head portion 46a. Gasket 48 and head portion 46a have a longitudinally extending bore (un-numbered) extending therethrough and within which is received a hollow puncture tool 50. The end of puncture tool 50 facing membrane 28' is cut at an angle transversely of the longitudinal axis of tool 50 to provide a sharp puncture tip. Passageway 50a of puncture tool 50 communicates via bore 46c with a discharge passageway 52. Discharge assembly 46 is received within the interior of outlet fixture 18' either threadably or slidably to enable movement of assembly 46 relative to outlet fixture 18' from the position of assembly 46 shown in FIG. 3 to an extended position not shown but analogous to that of FIG. 5. In the extended position puncture tool 50 punctures rupturable membrane 28' to release fluid sealant 24 from closed storage chamber 26' into discharge passageway 52, past a check valve 54.

A yieldable tool restraint means is provided in the illustrated embodiment by a coil spring 56 which is interposed between membrane 28' and gasket 48 in order to prevent accidental travel of puncture tool 50 into membrane 28' before use to prematurely puncture membrane 28'. Such accidental travel could be caused by dropping or mishandling the device or by vibration, etc., during handling and shipment. The imposition of positive pressure on discharge assembly 46 is required to overcome the resistance provided by coil spring 56, by compressing coil spring 56 to drive puncture tool 50 into membrane 28' to puncture the membrane. Obviously, expedients other than coil spring 56 could be used for the purpose. For example, a yieldable tool restraint means may comprise any suitable member which is configured to retain the puncture tool spaced from the rupturable membrane, but which yields to pressure imposed on it to permit movement of the tool to puncture the membrane. Such pressure may be, and usually is, imposed on the yieldable tool restraint means by connecting the outlet fixture to a service port of a pressurized closed system such as an air conditioning or refrigeration system. A structure in the service port, usually the operating pin of a Schrader valve bears against a tang or other structure on the discharge assembly 46 to force the discharge assembly 46 towards the outlet end 12b' of tube 12'. The yieldable tool restraint means may comprise any suitable structure: in addition to the spacer ring described above in connection with FIG. 2A, and a coil spring such as illustrated coil spring 56, the yieldable restraint means may comprise a leaf spring, a Bellville spring or some other compressible structure, a friction fit structure wherein the pressure imposed by connection of outlet fixture 18' to a service port overcomes frictional resistance to movement of the restraint means, a frangible structure which breaks under the imposed pressure to permit advance of the puncture tool into the membrane, etc. The required pressure is imposed upon connection of outlet fixture 18' via outlet collar 44 to the service port (not shown) of an air conditioning or refrigeration system, as discussed above.

Generally, embodiments of the present invention which include a puncture tool further comprise a puncture tool restraint member configured to be changed from an effective condition in which the restraint member prevents the movement of the puncture tool to the extended position, to a disabled condition in which the restraint member permits the movement. One way to disable the puncture tool restraint is to configure the restraint to be removed from the travel path when the device is placed in use. Another way is to configure the restraint member to comprise a yieldable member which is overcome by a force imposed on it by the puncture tool housing.

The lower section (as viewed in FIG. 3) of outlet collar 44 of outlet fixture 18' may be internally threaded (threads 44a) or otherwise configured to attach outlet fixture 18' to a service port located in the low pressure zone of the air conditioning, refrigeration or other closed system. An actuator tab 58 is provided on discharge assembly 46 to open the conventional Schrader valve (not shown) provided in the service ports of air conditioning and refrigeration systems, and to advance discharge assembly 46 towards membrane 28' as outlet collar 44 is screwed onto the service port to cause puncture tool 50 to puncture the membrane 28'. A valve seat gasket 60 seats on the Schrader valve (not shown) of the service port of the air conditioning or refrigeration system to which the outlet fixture 18' is connected.

In the embodiment of FIG. 3, tube 12' may be injection molded to form rupturable membrane 28' and end collar 42 integrally with tube 12' to provide a leakproof storage chamber 26' containing dispensable fluid sealant 24. The other end of storage chamber 26' of tube 12' is securely closed by, for example, the Schrader valve contained within the inlet closure member.

Tube 12' (like tube 12 and tube 12") is conveniently designed to withstand the highest pressure to which it will be subjected by any standard air conditioning, refrigeration or the like system. Alternatively, tube 12 may be provided in different strengths to withstand, without bursting, the highest pressure which will be encountered in a given type of system. Preferably, tubes 12, 12' and 12" are made with sufficient bursting strength to resist the highest pressure they will encounter in any standard air conditioning, refrigeration or the like system so that only a single tube part need be kept in inventory.

Referring now to FIGS. 4 and 5, there is shown another embodiment of the present invention utilizing an extruded rather than an injection molded tube. Except for the connection of tube 12" to outlet fixture 18" and the cartridge rupturable membrane 66, the structure shown is identical to that of FIG. 3 and so the description and numbering thereof is not repeated. FIG. 4 shows the puncture tool 50 in its retracted position and FIG. 5 shows the puncture tool in its extended position in which the puncture tool has ruptured the membrane 66. In this embodiment, tube 12" is an extruded tube and therefore, as manufactured, is open at both ends. Tube 12" may comprise a material identical to that from which injection molded tube 12' of the FIG. 3 embodiment is made. In this embodiment, the outlet end 12b" of tube 12" on which outlet fixture 18" is mounted is fitted with a metal cartridge-shaped member 62 which is crimped about the outlet end 12b" of tube 12". Member 62 is sometimes below simply referred to as a "cartridge". In order to reinforce the outlet end 12b" of tube 12" to resist the crimping pressure required to affix cartridge 62 to outer end 12b", a hollow reinforcement gusset 64 is positioned adjacent the outlet end 12b" in the storage chamber 26" of tube 12". Cartridge 62 has a base 62a which has a thinned portion aligned with storage chamber 26" to provide a cartridge rupturable membrane 66. The crimping of cartridge 62 about the outlet end 12b" of tube 12" provides a "blind" or closed outlet end of tube 12", as does the injection molded tube 12' of FIG. 3. In both cases, the need for an outlet valve, which may lead to leakage of liquid sealant 24 (FIG. 1, not shown in FIG. 4 or 5) with the attendant difficulties described above, is avoided.

In yet another embodiment of the present invention, puncture tool 50 could be eliminated and the rupturable membrane, 28 of the FIG. 2 embodiment or 66 of the FIG. 4 embodiment, is made thin enough and of a suitable material to be ruptured by pressure without use of a puncture tool. That is, the pressure imposed by connecting the inlet closure end 14 of the injection device 10 to the high pressure zone of a closed system will rupture the membrane without need of a puncture tool. In such case the rupturable membrane may optionally be scored to weaken it to facilitate rupture by the pressure imposed on the membrane.

While the invention has been described in detail with reference to specific embodiments, it will be appreciated that numerous variations may be made to the described embodiment, which variations nonetheless lie within the scope of the present invention.

What is claimed is:

1. A fluid injection device for injecting a dispensable fluid into a pressurized system having therein relatively high and low pressure zones of a pressurized fluid, the fluid injection device comprising:
a tube having an inlet end and an outlet end;
the inlet end having thereon an inlet closure member which is connectible in fluid flow communication to such high pressure zone, and the outlet end having thereon an outlet fixture which is connectible in fluid flow communication with such low pressure zone, to thereby enable connection of the injection device to such pressurized system;
the outlet fixture comprising an impermeable, rupturable membrane spaced from the inlet closure member to define within the tube a closed storage chamber disposed between the inlet closure member and the membrane, the membrane being configured to close the outlet fixture to fluid flow therethrough;
a dispensable fluid disposed within the closed storage chamber; and
the inlet closure member being operable from a closed position which seals the inlet end to an open position which opens the inlet end to passage therethrough of such pressurized fluid from such high pressure zone into the device, whereby upon connection of the fluid injection device to such pressurized system, the membrane is ruptured and the dispensable fluid is dispensed through the outlet fixture into such low pressure zone.

2. The device of claim 1 further comprising a puncture tool mounted on the device adjacent to the membrane and configured to be movable from a retracted, membrane-intact position to an extended position in which the tool punctures the membrane.

3. The device of claim 2 wherein the puncture tool is configured for automatic movement along a travel path from the retracted position to the extended position to puncture the membrane, the puncture tool being configured to be moved by force imposed on it upon connection of the outlet fixture to such low pressure zone.

4. The device of claim 2 further comprising a puncture tool restraint member configured to be changed from an effective condition in which the restraint member prevents the movement to the extended position to a disabled condition in which the restraint member permits the movement.

5. The device of claim 4 wherein when in the disabled condition, the restraint member is removed from the travel path.

6. The device of claim 4 wherein the restraint member comprises a yieldable member configured to be overcome by the said force imposed on it.

7. The device of claim 1 or claim 3 wherein the inlet closure member is configured to automatically be opened upon connection of the inlet closure member to such high pressure zone.

8. The device of claim 1 wherein the fluid injection device comprises an outlet passage adjacent the outlet end of the tube and the membrane closes the outlet passage to flow of the dispensable fluid therethrough.

9. The device of claim 8 wherein the outlet passage is defined at least in part by the outlet fixture.

10. The device of claim 9 wherein the outlet fixture comprises a fixture body having a connector extension which connects the outlet fixture to the outlet end of the tube, the outlet passage extends through the connector extension, and the membrane is disposed within the outlet passage.

11. The device of claim 1, claim 2 or claim 3 wherein the dispensable fluid is a sealant fluid suitable for sealing leaks in such pressurized system.

12. The device of claim 1, claim 2 or claim 3 wherein the tube is comprised of a moisture-impermeable material.

13. A fluid injection device for injecting a dispensable fluid into a pressurized system containing therein relatively high and low pressure zones of a pressurized fluid, the fluid injection device comprising:
   a tube having an inlet end and an outlet end;
   the inlet end having thereon an inlet closure member which is connectible in fluid flow communication to such high pressure zone, and the outlet end having thereon an outlet fixture which is connectible in fluid flow communication with such low pressure zone, to thereby enable connection of the injection device to such pressurized system;
   the outlet fixture comprising an impermeable, rupturable membrane spaced from the inlet closure member to define within the tube a closed storage chamber disposed between the inlet closure member and the membrane, the membrane being configured to close the outlet fixture to fluid flow therethrough;
   a dispensable fluid disposed within the closed storage chamber;
   a puncture tool mounted within the outlet fixture for automatic movement of the puncture tool upon the outlet fixture being connected to such low pressure zone, the automatic movement of the tool being from a retracted, membrane-intact position to an extended membrane-puncturing position of the tool; and
   the inlet closure member being configured to automatically, upon being connected to such high pressure zone, move from a closed position to an open position to permit passage therethrough of such pressurized fluid from such high pressure zone into the device to dispense the dispensable fluid through the outlet fixture into such low pressure zone.

14. The device of claim 13 wherein the outlet fixture comprises a fixture body having a connector extension through which the outlet passage extends, and the membrane is disposed within the outlet passage.

15. The device of claim 13 wherein the inlet closure member comprises a Schrader valve.

16. The device of claim 13, claim 14 or claim 15 wherein the dispensable fluid is a sealant fluid suitable for sealing leaks in such pressurized system.

17. A method of injecting a dispensable fluid into a pressurized system containing a pressurized fluid, the pressurized system defining a relatively high pressure zone and a relatively low pressure zone of pressurized fluid, the method comprising:
   connecting to the pressurized system a fluid injection device comprising a tube having an inlet end having thereon an inlet closure member and an outlet end having thereon an outlet fixture, the outlet fixture comprising an impermeable, rupturable membrane which closes the outlet fixture to fluid flow therethrough and cooperates with the inlet closure member to define a closed storage chamber disposed within the tube between the inlet closure member and the rupturable membrane,
   the storage chamber containing therein a dispensable fluid,
   and wherein the step of connecting the device to the closed system comprises connecting the inlet closure member in fluid flow communication to the high pressure zone and connecting the outlet fixture to the low pressure zone; and
   opening the inlet closure member to permit passage therethrough of the pressurized fluid from the high pressure zone, to rupture the rupturable membrane and dispense the dispensable fluid through the outlet fixture into the low pressure zone.

18. The method of claim 17 further comprising rupturing the rupturable membrane by piercing the membrane with a puncture tool.

19. The method of claim 18 further comprising automatically moving the puncture tool to rupture the membrane upon connection of the outlet fixture to the low pressure zone, and automatically opening the inlet closure member upon connection of the inlet closure member to the high pressure zone.

20. The method of claim 17 comprising rupturing the rupturable membrane by pressurizing the dispensable fluid to force it through the membrane.

* * * * *